United States Patent [19]

Eastridge

[11] Patent Number: 4,475,627
[45] Date of Patent: Oct. 9, 1984

[54] PORTABLE TREE STAND/CAMP STOOL
[75] Inventor: William K. Eastridge, Weaverville, N.C.
[73] Assignee: Bucksy Incorporated, Marshall, N.C.
[21] Appl. No.: 290,146
[22] Filed: Aug. 5, 1981
[51] Int. Cl.³ .................. A01M 31/02; A45F 3/26; A47C 9/10
[52] U.S. Cl. .................................. 182/187; 108/152
[58] Field of Search ............... 182/187, 188, 133–136; 108/134, 152

[56] References Cited
U.S. PATENT DOCUMENTS

| 3,368,725 | 2/1968 | Martin | 108/152 |
| 3,493,080 | 2/1970 | Ehlert | 182/187 |
| 3,871,482 | 3/1975 | Southard | 182/187 |
| 3,927,733 | 12/1975 | Wurn | 182/187 |
| 4,137,995 | 2/1979 | Fonte | 182/135 |
| 4,148,376 | 4/1979 | Campbell | 182/187 |
| 4,236,602 | 12/1980 | Leggett | 182/187 |

FOREIGN PATENT DOCUMENTS 268104 8/1950 Switzerland ............... 182/188

Primary Examiner—Reinaldo P. Machado
Attorney, Agent, or Firm—Tom R. Vestal

[57] ABSTRACT

A combination camp stool and tree stand has a chain and wedge bar combination that creates stable mounting on living trees without damaging the tree. The platform of the stand affords ample room and comfort for the occupant.

6 Claims, 8 Drawing Figures

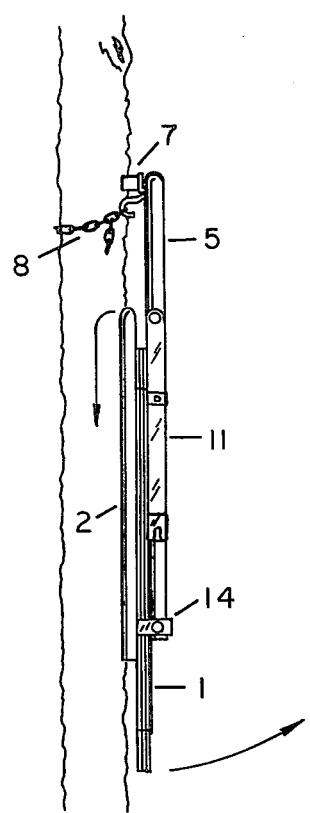
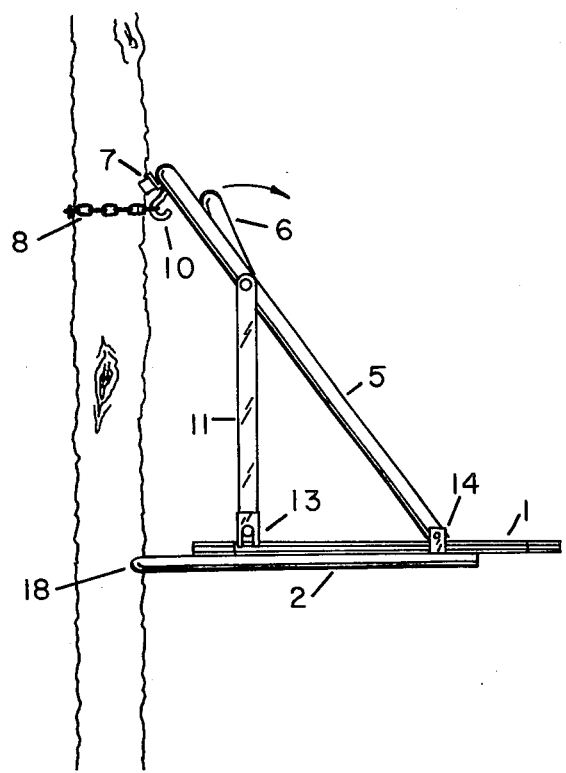
FIGURE 2
FIGURE 3

PORTABLE TREE STAND/CAMP STOOL

BACKGROUND OF THE INVENTION

The invention herein is for a tree stand/camp stool combination that is lightweight, simple in operation and rigidly attachable to a tree or other vertical wooden for use as a rest or perch. It is desirable to have such a perch, especially in hunting where it is advantageous to be elevated for ease of viewing of the quarry and for camouflage.

PRIOR ART

There are several tree stands disclosed in the art for similar purposes. U.S. Pat. No. 4,113,057 discloses a seat for attachment to a tree where the seat initially lies flat against the tree while a flexible support is wrapped around the tree. The seat is then rotated to the horizontal position, and support rods under the seat are engaged into the tree. As the seat is pivoted, piercing points engage the tree and push the seat outward, tightening the flexible support.

U.S. Pat. No. 3,871,482 depicts a folding tree seat that is secured to a tree or pole with a chain, a platform resting against the tree at a lower level.

U.S. Pat. No. 3,368,725 has a tubular frame with cleats that dig into the tree at a level lower than a wrap-around chain which secures the frame to the tree. The tubular frame also serves as a backpack for transport.

U.S. Pat. No. 3,927,733 has a pivotable tubular frame having a canvas seat attached. The tubular frame is attached to the tree by a tie belt and secured with rubber stabilizers. A fold-down frame member also converts the stand into a chair or stool.

BRIEF DESCRIPTION OF THE PRESENT INVENTION

The present invention provides a lightweight, rigidly constructed, comfortable combination tree stand and camp stool that is easily transportable from site to site. The framework construction provides rigid structure in place. The means for attachment to trees and the like provides steady, comfortable support to the user. The unit may be attached to a tree quickly and remove as quickly, the attaching technique being designed to be, at the same time, completely stable and have no harmful effects to the tree to which it is attached.

The design of the stand/stool is of lightweight but durable materials. The framework may be either of aluminum or light steel. The platform may be of a durable plywood material of ⅜ inch to ¾ inch thickness, preferable ½ inch to ⅝ inch marine-type plywood. A soft felting material is preferred for the top section for traction purposes. Heavy canvas material is used as seating material.

The gripping cleats are designed for sufficient but restricted penetration and work in conjunction with a wedge bar. The latter provides a tight, gripping fit against a tree or pole and limits the depth of penetration of the cleats.

BRIEF DESCRIPTION OF THE DRAWINGS

The FIG. 1 is a side view of the tree stand of the invention;

FIG. 2 shows the stand attached to the tree prior to opening;

FIG. 3 shows the stand in position with the seat up;

DETAILED DESCRIPTION OF THE DRAWINGS

Figure 1:
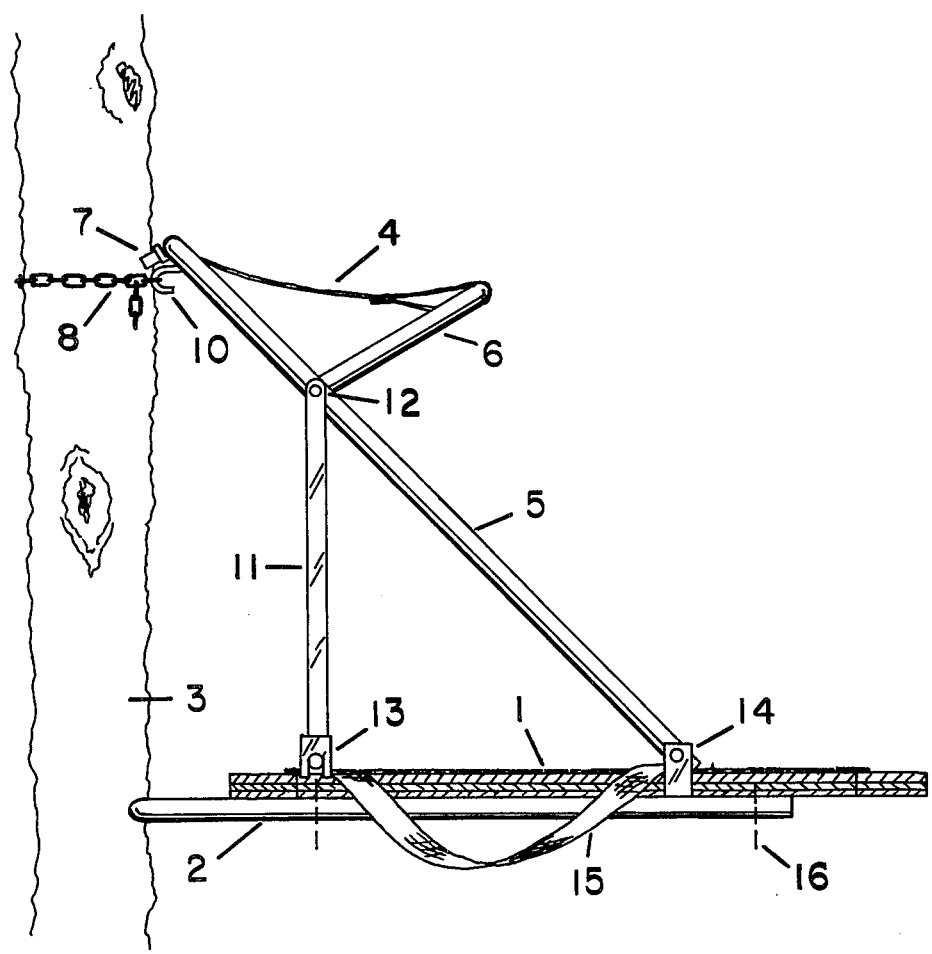

FIG. 1, the stand is shown comprising a horizontal platform 1 fixedly attached to two braces 2 by screws 16. The braces 2 have ends 18 that are cut to rest against tree 3 so that the reaction force from the tree lies approximately radially outward.

The stand is further supported against the tree 3 by a chain 8 attached at point 28 (FIG. 6) to wedge bar 7, wrapped around the tree and secured to chain hook 10. A support frame 5 is pivotally attached on both sides of platform 1 by hinges 14. A bracing strut 11 may be attached to the platform 1 by latch means 13, described later herein.

Figure 5:
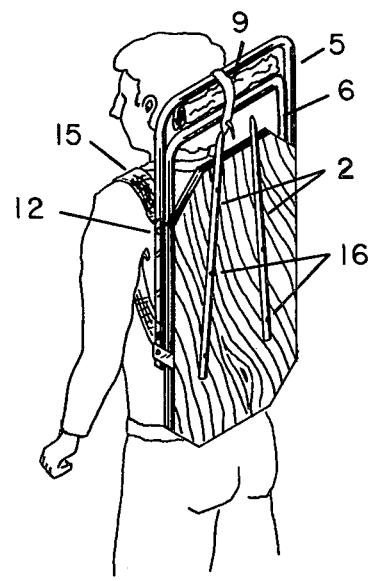
FIG. 5 depicts the stand in a folded condition for carrying.

The first step in mounting the tree stand to a tree or similar object is shown in FIG. 2. The stand in its folded condition (see FIG. 5) is laid against the tree at the desired height, and chain 8 is wrapped around the tree and secured to hook 10 in the tightest link of the chain.

The bottom end of platform 1 is then lifted outward and pivoted around pivot 14 until the platform 1 is substantially horizontal and latch means 13 can engage bracing strut 11 to the platform 1, as shown in FIG. 3. Ends 18 of braces 2 are then pressed against the tree.

As support frame 5 is rotated outward from the tree 3, cleats 17 in wedge bar 7 engage the tree 3 to secure it in place and prevent the platform from rotating about the tree. The leverage action as the tree stand pivots onto the cleats 17 tightens the chain 8 around the tree, embedding the cleats 17 in the tree. The wedging action of the pivot will be explained further with respect to FIGS. 6 and 6A.

Figure 4:
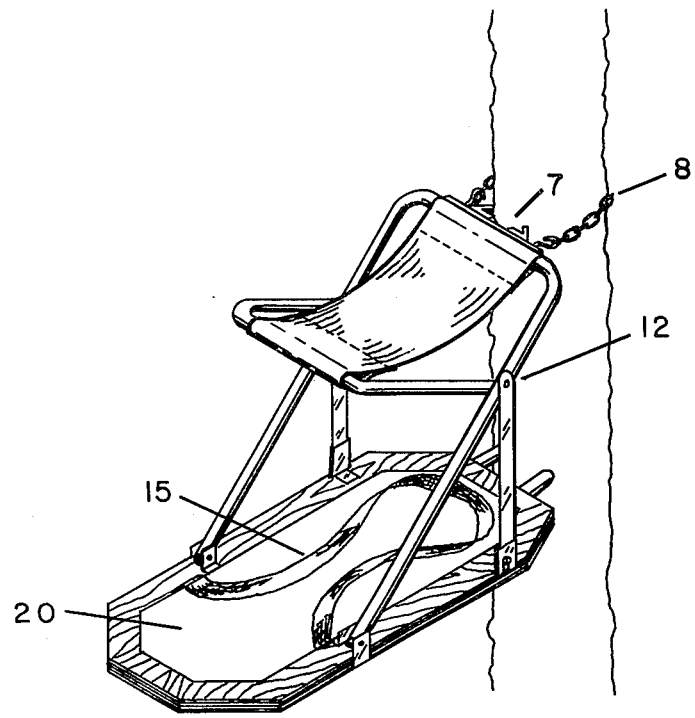
FIG. 4 depicts the stand in isometric view with the seat down.

FIG. 4 depicts the tree stand in open position mounted on a tree and with the seat canvas 4 extended for sitting. If desired, a mat 20 of appropriate material, such as felting or lightweight carpet, can be attached to the upper side of platform 1 to provide a nonskid, silent surface in place and a soft support when the seat is being transported via straps 15.

As shown in FIG. 3, the seat frame 5 is also rotatable about its base at pivot 12 and can be rotated out of the way to permit full usage of platform 1 for standing. Additionally, seat frame 5 can be pointed downward so that moisture will not collect in the seat. As can be noted from FIG. 5, both support frame 5 and seat frame 6 fold neatly within themselves for efficient, comfortable transporting. It is especially helpful to wrap the chain 8 within the seating material and secure the chain 8. A leather thong 9 may be wrapped around the seat material and bound chain 8 and secured for travel or storage.

The tree stand/camping stool is shown in its carrying position. Carrying straps 15 are shown around the shoulders of the transporter in a manner that has the stand riding comfortably on the transporter's back. Chain 8 is wrapped in canvas seating material 4 and secured by leather tie wrapping 9.

Figure 6:
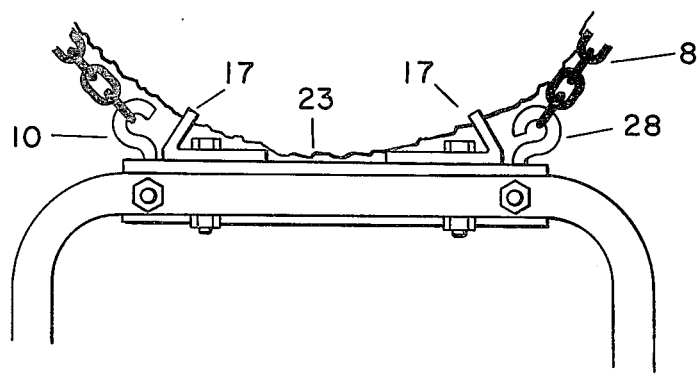
FIGS. 6 and 6A depict the wedge bar/cleat arrangement of the invention.
Figure 6A:
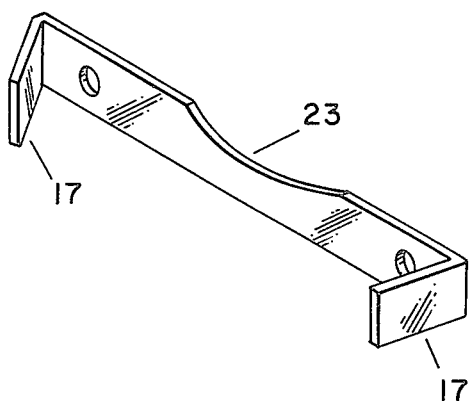

In FIGS. 6 and 6A, the action of the wedge bar against a tree or other support 3 is explained in more detail. The wedge bar 7 and cleats 17 may be formed from a single piece of material. The cleats are bent inwardly at approximately a radial direction when viewed relative to a tree. The flat end 19 of the cleat rests against the tree as the seat is being readied for opening. (See FIG. 2.)

As the seat is rotated outward, the chain 8 is tightened, and cleats 17 dig into the outer bark of the tree due to the pivotal action around hook 10 and corresponding chain attachment 28 positioned below the wedge bar 7. The penetration of the cleats is suppressed by contact with the tree of the notched segment 23, thereby avoiding penetration into the inner bark or cambium of the tree and damage to the tree. The notched segment 23 is designed also to exhibit substantial frictional forces against the tree and inhibit any lateral movement about the tree. When the platform braces are in place, the wedging action of the wedge bar 7, chain 8 and cleats 17 is sustained.

Figure 7:
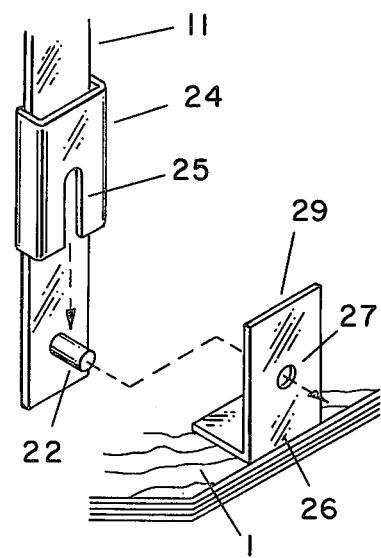
FIG. 7 illustrates one latching mechanism.

In FIG. 7, a detail of a preferred latching mechanism 13 is shown. Bracket 26 is attached to platform 1 in a conventional manner. Reinforcing strut 11 has attached at its lower end a dowel 22, the attachment again being conventional but sturdy manner. An opening 27 is provided in bracket 26 of sufficient size to accept dowel 22. When the platform is in a horizontal position, strut 11 is aligned with bracket 26 so that the dowel 22 is inserted therein. A sleeve 24 around strut 11 then is moved downward to encompass the upper section 29 of bracket 26 and the lower section of strut 11 and thus lock the strut securely to platform 1. A slot 25 may be provided in sleeve 24 to enable the sleeve to move further down bracket 26 and dowel 22. It is observed that strut 11 is in tension when the stand is positioned in a tree, and in compression when the stand is used as a self-supporting camp stool.

Weight of the stand is important, and the materials of construction should be lightweight but sufficiently strong enough to support the stresses placed upon the stand during usage. One embodiment has a platform 1 of ¼ inch to ⅜ inch marine plywood with framing of light steel tubing appropriately bent. It is recognized that different materials of construction may be used within the scope of this invention and that different embodiments may be suggested to those skilled in the art by the discussion herein. The scope of the invention is set out in the following claims.

What is claimed is:

1. A portable seating device useful as a self supporting campstool or tree supported stand, comprising a substantially flat platform; a tubular support frame, comprising two leg sections and a cross connection section, pivotally mounted at the lower end of the platform; a rigid reinforcing strut, pivotally mounted outwardly at one end to a determined point of each support frame leg section; means for detachably mounting the other end of each reinforcing strut to the upper end of the platform; a seat frame having a seat, comprising two leg sections and a cross connection section, said seat frame being pivotably mounted inwardly of and to said determined point of each support frame leg section whereby said seat frame can be rotated to a downward and out of the way position so moisture will not collect on the seat, said support frame, seat frame and reinforcing struts being foldable to said platform to define a closed position and defining an open position when said reinforcing struts are mounted at the upper end of the platform; a wedge means attached to the support frame cross connection section; and a flexible, elongated support means attached to said support frame cross connection section for wrapping around a tree to secure the support frame cross connection section to said tree, said flexible support means being attached below said wedge means, whereby, when the seating device is secured to a tree in the closed position, opening the seating device forces the wedge means into the outer surface of the tree.

2. The portable seating device of claim 1, wherein the reinforcing strut mounting means comprises a bracket mounted to the upper end of the platform, said bracket having an upper section with an opening therethrough; a dowel attached to the other end of the strut and receivable into said opening; and a sleeve slidably mountable on the strut and over the upper section of the bracket to define a lock position.

3. The portable seating device of claim 2, including a slot in the sleeve to accept the dowel in the lock position.

4. The portable seating device of claim 1, wherein the wedge means comprises a wedge bar having cleats at each end for engaging a tree, said cleats being bent inwardly at approximately a radial direction relative to the tree and means for contacting the tree and limiting penetration of the cleats into the tree.

5. A portable seating device useful as a self supporting campstool or tree supported stand, comprising a substantially flat platform; a tubular support frame, comprising two leg sections and a cross connection section, pivotedly mounted at the lower end of the platform; a rigid reinforcing strut, pivotally mounted outwardly at one end to a determined point of each support frame leg section; means for detachably mounting the other end of each reinforcing strut to the upper end of the platform, comprising a bracket mounted to the upper end of the platform, said bracket having an upper section with an opening therethrough, a dowel attached to the other end of the strut and receivable into said opening, and a sleeve slidably mountable on the strut and over the upper section of the bracket to define a lock position; a seat frame, comprising two leg sections and a cross connection section, said seat frame being pivotally mounted inwardly of and to said determined point of each support frame leg section, said support frame, seat frame and reinforcing struts being foldable to said platform to define a closed position and defining an open position when said reinforcing struts are mounted at the upper end of the platform; a wedge means attached to the support frame cross connection section; and a flexible, elongated support means attached to said support frame cross connection section for wrapping around a tree to secure the support frame cross connection section to said tree, said flexible support means being attached below said wedge means, whereby, when the seating device is secured to a tree in the closed position, opening the seating device forces the wedge means into the outer surface of the tree.

6. The portable seating device of claim 5, including a slot in the sleeve to accept the device in lock position.

* * * * *